Patented Dec. 16, 1947

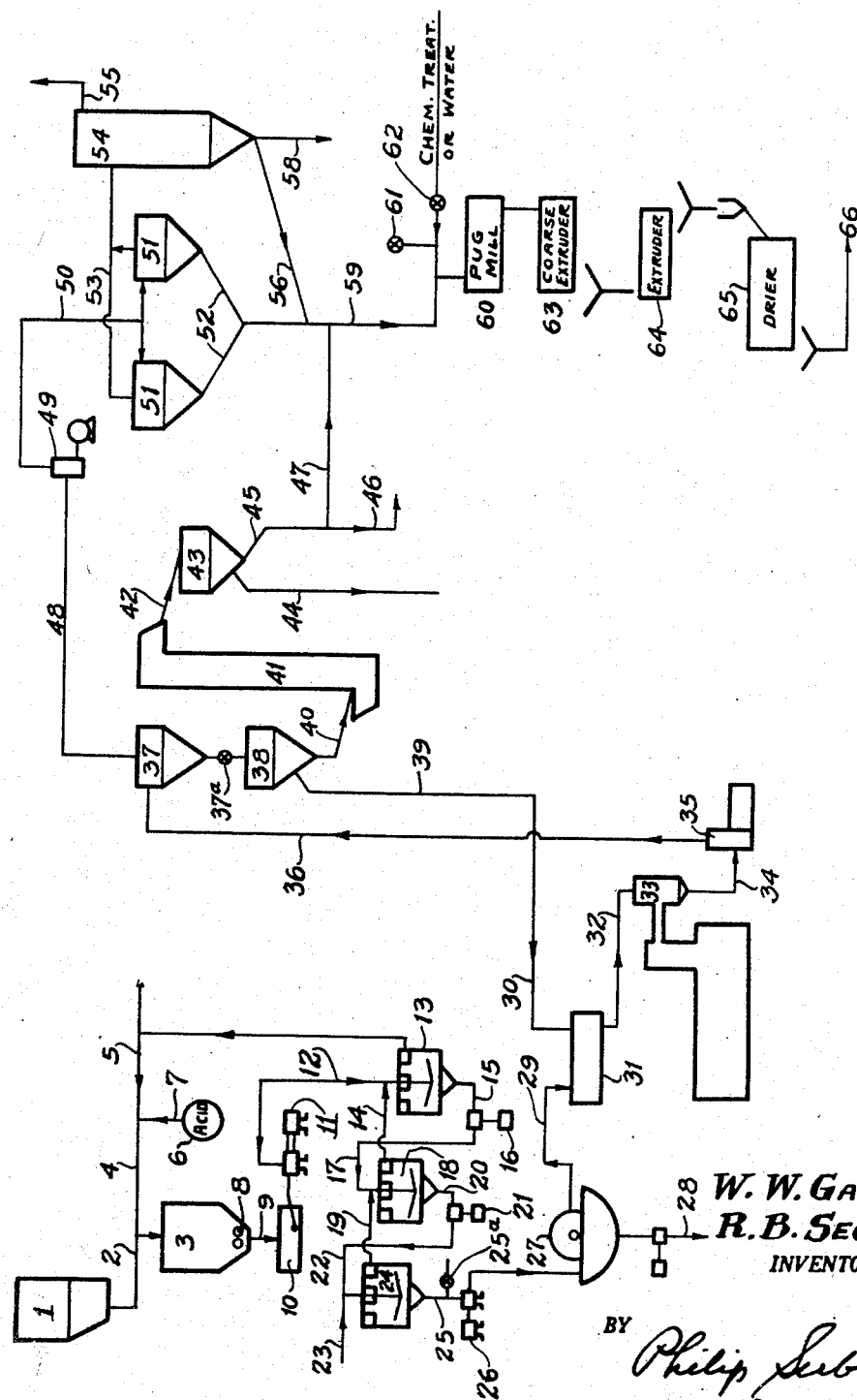

2,432,746

UNITED STATES PATENT OFFICE 2,432,746

PROCESS FOR CATALYTIC CRACKING OF PETROLEUM HYDROCARBONS

Wright W. Gary, Los Angeles, and Robert B. Secor, South Gate, Calif., assignors to Filtrol Corporation, Los Angeles, Calif., a corporation of Delaware Application February 7, 1944, Serial No. 521,446

5 Claims. (Cl. 196—52)

This process relates to a method of producing active catalytic material of the bentonite clay type. As is well known, bentonitic clays, particularly montmorillonite clays, classifiable as sub-bentonites, may, on acid treatment, be converted into active adsorbents for liquids and gases useful as catalysts. Such catalysts have found a wide application in catalytic cracking of petroleum.

The clay is essentially an alumino silicate, in which part of the alumina is substituted by MgO and in which the hydrogen of the montmorillonite acid is replaced by base exchange with Ca and Mg and other ions. Such clays may also contain iron in the form of silicates or in the form of other compounds such as sulfides or as lattice iron. A typical analysis of such clays (Cheto clay) is given by the following:

| | Per cent |
|---|---|
| Silica ($SiO_2$) | 67.3 |
| Alumina ($Al_2O_3$) | 19.5 |
| Iron oxide ($Fe_2O_3$) | 1.8 |
| Magnesium oxide (MgO) | 6.9 |
| Calcium oxide (CaO) | 3.2 |
| Manganese oxide (MnO) | 9.8 |
| Titanium oxide ($TiO_2$) | 0.3 |
| | 99.8 |

The natural clay is fundamentally montmorillonite, having base exchange capacity of about 124 milliequivalents per 100 grams volatile free substance, this capacity being saturated largely with alkaline earth ions such as calcium and magnesium. Natural clay therefore can be defined as a calcium or magnesium montmorillonite.

Upon acid treating the clay, one of the first reactions is the replacement of the calcium and magnesium ions to form a product which is predominately hydrogen montmorillonite. This material may be termed a clay acid in that it shows acidic properties. On relatively light acid treatment calcium and magnesium are not completely removed. As the acid leaching continues alumina and also iron oxide present as impurities are removed. Hydrogen enters into the lattice of the leached clay as the alumina is extracted and there is a loss in base exchange capacity. It is believed, however, that as long as the resulting product is not subjected to rigorous treatment, such as extensive dehydration, the hydrated silica, which is part of the original montmorillonite lattice and which is left as a result of the leaching, is isomorphic with the original montmorillonite; that is to say, the silica and oxygen skeleton of the original montmorillonite is retained. As this extraction continues with reduction of base exchange capacity, as explained, the calcium and magnesium and alumina are more and more completely removed, and a material of lowered base exchange capacity is left.

The degree of removal of $R_2O_3$, namely $Al_2O_3$ and $Fe_2O_3$, is a function of the degree of extraction, that is, it depends on the time, temperature, and concentration of acid employed. The result of this increasing degree of extraction is not merely a difference in degree of improvement in adsorptive and catalytic efficiency, since these properties do not proceed in step with the degree of extraction. Thus, the first of 3% or 4% of $Al_2O_3$ removed gives the largest amplification of adsorptive and catalytic efficiency, and on a further extraction these efficiencies increase further and pass through a maximum, and when the extraction is continued to reduce the $R_2O_3$ content to below about 10% or 12%, the efficiency falls off and becomes as inert as the original clay when the $R_2O_3$ content is reduced to about 1% to 2% or 3%.

In the acid treatment of the clay, the clay, after coarse grinding, is treated with sulfuric acid of concentration from 5% to 60%, employing a dosage of from 20 to 150 pounds of anhydrous acid per 100 pounds of clay (volatile free, i. e., no V. M.). The time and temperature of extraction is that necessary to give the desired degree of $Al_2O_3$ extraction. The degree of extraction will vary to yield clays of from 10 to 20% $R_2O_3$.

A typical example of this procedure employs an acid strength of about 12% to 15% and an amount of acid equal to about 30 to 50 pounds of acid per pound of volatile free clay. The temperature employed is about 180° F. to 210° F. The time may be about 6 to 9 hours.

In the case of the clays whose typical analysis is given above, the extraction is continued to give a clay with an $R_2O_3$ content of about 16% to about 17%. The time usually is about 6 hours. The clay is washed in Dorr thickeners and the solids are separated from the acid liquor and washed, i. e., by countercurrent decantation cracking. The thickened slurry is then washed, dried, and ground.

The clay at the completion of the desired extraction is suspended in the treating liquor which is a solution of residual unconsumed sulfuric acid and sulfates of aluminum, calcium, magnesium, and other metallic ions extracted during the treatment. The main bulk of the solution is separated by decantation and washing. These salts and acid are thus washed out and the clay separated. Depending on the degree of washing, the resultant clay will contain in adsorbed state more or less of these salts and more or less of this acid. The retained sulfuric acid and the acid salts, such as alumina sulfate, will give an acid reaction. The montmorillonite acid is also a relatively strong acid. This residual acidity, herein called "titratable" acidity, may be determined by the methods hereinafter set out.

We have now discovered that a clay which has been washed to a degree to leave a residual titratable acidity may be further activated to increase its catalytic activity by ammoniation of the clay. The acid treated clay, which has been washed to leave a residual titratable acidity, is treated with ammonium hydroxide.

While we do not wish to be bound by any theory of the action of the ammonia, we believe that the ammonia reacts both with the free sulfuric acid and with the aluminum sulfate, and other sulfates which are present, adsorbed and otherwise contained in the clay, to form ammonium sulfate and hydrated alumina and some other bases, and also that the ammonia is adsorbed by the clay entering between the plates of the montmorillonite crystal structure. Additionally, the ammonia enters into the clay structure by base exchange with the hydrogen of the montmorillonite and thus forms an ammonium clay. Thus, a clay treated with ammonia may have, for example, a base exchange capacity of 40 to 110 milliequivalents of which, for instance, 5 to 80 or more may be satisfied by base exchangeable ammonia, the remaining being satisfied in part by Ca and in part by Mg.

This clay when subjected to temperatures in the range of 900° to 1200° F. loses substantially all of its ammonia. Any residual ammonium sulfate is decomposed and the base exchange ammonia is removed, we believe, to yield a hydrogen clay. This ammonia complex is unstable at high temperatures. The ammonium sulfate is decomposed at a temperature of about 500° to 600° F. and substantially all of the ammonia, contained both as ammonium sulfate and base exchange ammonia, is removed by heating the clay to 900° to 1200° F. This procedure differs also from the treatment of the clay by mixing the acid treated clay with aluminum sulfate or other soluble aluminum salt and neutralizing the solution with ammonia to precipitate the hydrated alumina in the presence of the clay. No extraneous aluminum sulfate is employed in our process.

The acid activated clay may also be treated to neutralize or partially neutralize the residual acidity as herein described by treating the clay containing residual acidity with other bases or metal salts such as NaOH, KOH in the place of the ammonia, in accordance with the procedures herein described. The resultant clay contains sodium or potassium sulfate or sulfates of the metal employed in the neutralizing agent, and the acid clay is converted into alkali or other metal clay, as, for instance, a sodium clay or a potassium clay or a calcium or magnesium clay. The hydrogen of the montmorillonite is replaced by the alkali metal, alkaline earth metal, or other metal ion whose compound is used as a neutralizing agent. Such a clay when subjected to the above temperatures does not lose its base exchanged metal ion and the sodium or potassium or other sulfate stable at the temperatures of the drying or calcination or at the start temperature employed is not removed by decomposition as in the case of the ammonia activated clay.

In catalytic reactions such as in hydrocarbon conversion wherein the clay in its catalytic reactions is subjected to temperatures up to 900° or 1000° F. and in the regeneration operations wherein the spent catalyst from the catalysis is regenerated at temperatures of 1000° to 1150° F. the ammoniated clays are subjected to temperatures at which the clay loses the ammonia. Thus, the clay is first produced as an ammonia clay and is de-ammoniated in the course of its use and throughout the major portion of its useful life it is in a de-ammoniated condition. In contradistinction, the alkali clays are stable and the base exchangeable alkali ions, which are not as useful as the base exchangeable acid hydrogen in catalysis employing acid activated clay are retained on the clay.

This invention will be further described by reference to the accompanying drawing which illustrates embodiments of our invention by a schematic flow sheet.

The mined clay which has been ground to from an 8 to 12 mesh is contained in bin 1 from which it is fed by a suitable conveyor system, schematically indicated by line 2. It is fed into the acid treating chamber 3 into which has been charged the acid water through line 5 passing via line 4. Additional acid is passed from container 6 and line 7 into treater 3 to supply the desired quantity of acid for treatment at the desired concentration. Steam and air are introduced to agitator 8 and the temperature of the reaction vessel is maintained in this way at the desired level. The acid treated clay is discharged through line 9 into chamber 10 from which the slurry of clay and residual acid is pumped by pump 11 in line 12 into the decantation washing system. This is schematically shown as three Dorr type thickeners, although a larger number may be employed to obtain the desired treatment.

The slurry enters the first thickener 13 where it is mixed with the overflow from thickener 18 passing through line 14. The overflow through line 5 is returned in part for use in treater 3 and part discharged to the sewer or for other utilization. The thickened underflow is passed through line 15 and pump 16 through line 17 where it enters into thickener 18 commingled with the overflow from thickener 24 passing through line 19. The underflow passing through line 20 is pumped by pump 21 through line 22 where it is mixed with fresh water entering through 23 and is introduced into thickener 24. The underflow from thickener 24 passes through line 25 and is pumped by pump 26 into the filter 27. The degree of washing in the Dorr thickeners and on the filter is sufficient to remove soluble salts and free sulfuric acid. The residual acidity of the clay consisting of adsorbed aluminum sulfate and free sulfuric acid will vary in equivalency from about 1 to 140 and higher milligrams of KOH per gram of dry clay, depending on the degree of washing. On its way to the filter the clay slurry is treated with sufficient ammonium hydroxide introduced through 25a to reduce the clay slurry to a pH of 4 to 9, preferably 5 to 7. The filtrate is withdrawn through 28. The filter cake may then be washed with water.

The acid treated cake is passed through a pug mill 31 where it meets the over-sized material passing through line 30, as will be described later, and the commingled material passes through line 32 into the flash drier 33 wherein it is mixed with hot gases generated in the flash drier. The material is usually dried to a V. M. of from 15 to 25%. The stream of gas and clay is then passed through line 34 into a mill 35, such as a cage mill, and the gases and clay enter the separator system 37 and 38. The gases are discharged from cyclone separator 37 through 48 and the solids pass through a rotary valve 37a into a separator 38. Separator 38 may be of the whizzer type in which a rotary fan sets up a centrifugal motion of the clay particles, causing the separation of the desired material into two fractions, a coarser fraction, which is removed via 39 to be passed to the pug mill 31, and a finer fraction which is removed via line 40. This material is elevated by elevator 41 and passed through line 42 into a second whizzer type separator 43. The coarser fraction through line 44 is treated as is described below. The finer material passes through line 45 and may be split, part or all passing through 46 for uses to be further described. Part or all may be passed through line 47, as will be later described. The gas stream separated in 48 is passed by blower 49 into cyclones 51 through line 50. The solids separated in these cyclones are passed through line 52. The gases issuing through line 53 pass to an electrical precipitator 54 and the gases, substantially free of solids, are discharged through 55. The electrical precipitated material may be passed through line 56 to join the material in line 52 or, in part or whole, may be discharged through line 58 for other uses.

In this extruder system the material which is separated through 52 is introduced into pug mill 60. If desired a portion of the material separated in 56, together with some material separated from 47 and some material removed via 44 and passing through 79, may be commingled in the pug mill 60 with the desired amount of water. The amount of water employed is that required for proper extrusion into pellets and usually ranges from 40 to 50%. The material passes from the pug mill into a screw type extruder in which the clay passes through large orifices under extrusion pressure of an auger screw, and the extruded material is cut into convenient lengths. It then passes into final extruder 64. The clay pellets are re-pulped and forced through finer orifices of desired dimensions, and cut into desired sized pellets. They then pass through drier 65 to storage.

The pellet may range from $\frac{1}{16}''$ to $\frac{3}{32}''$ in diameter up to larger sized pellets, depending on their use, and usually are cut off to a length equal to their diameter.

Instead of treating the material prior to filtration and drying, the material may be dried, separated, and the material in the pug mill 60 may be ammoniated by supplying the ammonia to the water used for making the extrudable mix. In such case the ammonia is added to the water in amounts and concentration to give the desired pH for the clay, for example, 4 to 9 pH, preferably about 5 to 7 pH.

Instead of employing the pug mill for the ammoniation, the dried and separated material may be suspended in an ammonia solution and agitated and the mixture filtered, dried, ground, and then extruded in the above manner.

In this specification, when we employ the terms "per cent V. M.," "titratable acidity," "pH," "catalytic activity for cracking," "density," the values thereof may be determined by the following procedures:

*"Per cent V. M."*—Five grams of the catalyst are placed into a 20 cc. crucible and ignited in an electric furnace for 30 minutes at a temperature of at least 1800° F. and cooled in a desiccator.

Per cent volatile matter = $\frac{\text{loss of weight} \times 100}{\text{weight of ignited clay}}$

*"Titratable acidity."*—This acidity is determined by the so-called "boil-out" test, in which 5 grams of the clay are boiled with 50 cubic centimeters of distilled water, filtered, and the filter cake washed with 50 cubic centimeters of hot distilled water. The acidity is determined by titration, using phenolphthalein indicator. The acidity expressed in milligrams of KOH per gram of sample is termed "titratable acidity." Titratable acidity, unless otherwise specified, is shown as based on 20 V. M. clay.

*"pH."*—The clay is dispersed in water in an amount greater than about 20% solids at ordinary room temperature and the pH determined by a pH meter.

*"Catalytic activity."*—The dried catalyst pellet, such as the pellet formed as described above, is introduced into an oven maintained at 1050° F. and the pellet maintained at this temperature for a period of five hours. The catalyst is then cooled without access to air in a desiccator or similar container, and upon cooling is transferred to air-tight containers. 200 cc. of the catalyst (i. e., sufficient catalyst pellets to occupy 200 cc.) are then transferred into the cracking chamber of the catalyst cracking unit. The catalyst is raised to 800° F. and a vaporized gas-oil (for example, 35.5–37.5 A. P. I. East Texas gas-oil having 700–730° end-point) is passed through the unit at a rate of 30 liters of liquid oil per hour per 20 liters of catalyst. The exiting vapors from the cracking chamber are condensed at a temperature of 60° F. The condensate thus collected is termed the first-cycle condensate. The gases are collected.

At the end of 10 minutes the cracking is discontinued and the catalyst is regenerated by raising its temperature to 900° F. and passing air through the catalyst to convert the deposited carbon into CO and $CO_2$. The passage of air is continued until no substantial amounts of carbon monoxide or carbon dioxide are present in the exiting gases. The exiting gases are then passed to a combustion chamber and any CO is converted to $CO_2$. The total $CO_2$ is determined and the carbon equivalent thereto is determined.

The air flow is then discontinued and the temperature of the catalyst is reduced to 800° F. and a second cycle of 10 minutes is carried out in the manner previously described. Repeated cycles of regeneration and cracking are carried out. The average of several cycles, excluding the first cycle, is taken and is hereinafter reported in the examples given below. The gasoline is reported as volume per cent of feed, gas as weight per cent of feed, and carbon or coke as weight per cent of feed.

The following examples of the operation of my process are given for the purposes of illustrating, and not for the purposes of limiting, our invention:

*Example 1*

The Cheto clay whose analysis is given above was treated with 30 pounds of acid at a concentration of 12.5% for 6 hours at a temperature of 200 to 210° F. The clay was washed to a titratable acidity of 25 mg. of KOH per gram of clay. The clay was dried, separated, and pelleted by the above procedure. No ammonia was used. The pellets leaving the extruder (termed "green" pellets) had a V. M. of 45.3 and were dried to a V. M. of 23.3%, and had an apparent density of .766. The clay had the following analysis:

| | Per cent |
|---|---|
| $SiO_2$ | 71.5 |
| $R_2O_3$ | 18.40 |
| $Fe_2O_3$ | 1.7 |
| CaO | 3.1 |
| MgO | 4.3 |
| $SO_3$ | 4.7 |

Its catalytic activity in the above process of cracking was: 410° end-point gasoline, 34.6%; gas, 4.1%; carbon, 3.2%.

Example 2

The same clay was treated and pelleted in the same manner except that ammonia was added to the pelleting water to bring the clay to 5 pH. The pellet thus formed when dried to substantially the same V. M. had a density of .678. When used in the above process of catalysis it gave the following results: 410° end-point gasoline, 39.3%; gas, 5.1%; carbon, 4.4%.

Example 3

A Purvis clay, a clay of the type previously described, was extracted employing 50 pounds of acid per 100 pounds of volatile free clay at 21.5% concentration for 6 hours at from 200° to 210° F. This clay was washed to 22 mg. of KOH acidity. It was dried, ground, separated, and pelleted according to the above method. The pellet had a density of .852 and the following analysis:

| | Per cent |
|---|---|
| $SiO_2$ | 77 |
| $R_2O_3$ | 17.4 |
| $Fe_2O_3$ | 1.0 |
| CaO | 2.2 |
| MgO | 3.6 |

When used in the above method of catalytic cracking it gave the following results: 410° endpoint gasoline, 25.1%; gas, 3.7%; coke, 3.4%.

Example 4

The clay of Example 3 was treated in the described Example 3, except that sufficient ammonia was added to the pelleting water to bring the clay to 5 pH. The pellets thus produced had a density of .788 and gave the following results when used in the above process of catalytic cracking: 410° end-point gasoline, 31.3%; gas, 4.0%; carbon, 3.3%.

Example 5

The Cheto clay previously described was treated with a total of 70 pounds of anhydrous sulfuric acid per 100 pounds of volatile free clay, the acid being at 10% concentration for a period of 6 hours at 200° to 210° F., the acid being added incrementally to maintain a 10% concentration throughout the treat. The clay was washed to an acidity of 140 mg. of KOH per gram by diluting the material withdrawn from 3 with equal parts of water and filtering. The clay was dried, ground, and separated. The material withdrawn was then mixed with water containing enough $NH_4OH$ to form a slurry at 5 pH. The material was then filtered. The filter cake was washed and dried and pelleted. The pellets had a density of .596. The clay when employed in the above cracking method gave the following results: 410° endpoint gasoline, 40.6%; gas, 5.4%; carbon, 4.1%.

Example 6

Purvis clay was treated with 50 pounds of anhydrous sulfuric acid per 100 pounds of volatile free clay of 21.5% concentration for 6 hours at a temperature of 200 to 210° F. The clay was washed, filtered, dried, ground, and separated to produce a clay of 22% V. M. It was pelleted in accordance with the method previously described. The clay had a residual acidity of 10.6 mg. of KOH per gram of clay. A water slurry of this clay had a pH of 2.95. The pellets had an apparent density of .8, and when employed in the previously described method of catalysis it gave the following results: 410° end-point gasoline, 29.2%; gas, 3.2%; carbon, 3.7%.

Example 7

The clay of Example 6 was treated in the same manner as in Example 6 except that ammonia was introduced through line 25a sufficient to bring the slurry passing to the filter 27 to 5 pH. The dried clay had an acidity of 5.4 mg. of KOH per gram (at V. M. of 23.8%). A slurry of the clay had a pH of 4.12. The clay was pelleted in the same manner as Example 6. The pellets had an apparent density of .704, and when employed in the above process of cracking gave the following results: 410° end-point gasoline, 32.3%; gas, 3.7%; carbon, 2.6%.

It will be observed that the treatment with ammonia reduced the acidity of the clay and gave pellets of decreased apparent density and improved catalytic efficiency. The yield of gasoline obtained was increased and with reduced carbon formation.

While we have described a particular embodiment of our invention for the purpose of illustration, it should be understood that various modifications and adaptations thereof may be made within the spirit of the invention as set forth in the appended claims.

We claim:

1. A process for catalytic cracking of petroleum hydrocarbons, which comprises contacting petroleum oil at a temperature of about 900° F. to 1000° F. with an activated clay catalyst produced by acid treating an acid activatable clay having base exchangeable ions with a mineral acid to reduce substantially the alumina content of said clay and increase its catalytic activity, separating the acid from the clay to produce a clay containing an appreciable residual titratable acidity, reacting said clay with ammonium hydroxide in amount sufficient to reduce said titratable acidity and to introduce ammonia into base exchange position on said clay.

2. A process for catalytic cracking petroleum hydrocarbons, which comprises contacting a petroleum oil at a temperature of about 900° F. to 1000° F. with an activated clay catalyst produced by acid treating an acid activatable clay having base exchangeable ions with a mineral acid to reduce substantially the alumina content of said clay and increase its catalytic activity, separating the acid from the clay to produce a clay containing a residual titratable acidity within the range of from 5 to 140 milligrams of KOH per 100 grams of dry clay, reacting said clay with ammonium hydroxide in amount sufficient to reduce said titratable acidity and to introduce from 5 to 80 milliequivalents of ammonia into base exchange position on said clay.

3. A process for catalytic cracking petroleum hydrocarbons, which comprises contacting a petroleum oil at a temperature of about 900° F. to 1000° F. with a sub-bentonite clay catalyst produced by acid treating a montmorillonite acid activatable sub-bentonite clay with a mineral acid to reduce substantially the alumina content of said clay and increase its catalytic activity, separating the acid from the clay to produce a a clay containing an appreciable residual titratable acidity, reacting said clay containing said titratable acidity with ammonia hydroxide in amount sufficient to reduce that titratable acidity and to introduce ammonia into base exchange position on said sub-bentonite clay.

4. A process for catalytic cracking petroleum hydrocarbons, which comprises contacting a petroleum hydrocarbon oil under cracking conditions with an ammoniated acid activated clay catalyst produced by acid treating an acid activatable montmorillonite clay having base exchangeable ions with a mineral acid to reduce substantially the alumina content of said clay and increase its catalytic activity, separating acid from the clay to produce a clay containing residual titratable acidity, reacting said clay with ammonium hydroxide in amount sufficient to introduce ammonium ions into base exchange position on said clay and to reduce said titratable acidity.

5. A process for catalytic cracking petroleum hydrocarbons which comprises contacting a petroleum hydrocarbon oil under cracking conditions with an ammoniated acid activated clay catalyst produced by acid treating an acid activatable montmorillonite clay having base exchangeable ions with a mineral acid to reduce substantially the alumina content of said clay and increase its catalytic activity, separating the acid from the clay to produce a clay containing a residual titratable acidity within the range of from 5 to 140 milligrams of KOH per 100 grams of dry clay, reacting said clay with ammonium hydroxide in amount sufficient to introduce from 5 to 80 milliequivalents of ammonium ions into base exchange position on said clay and to reduce the titratable acidity.

WRIGHT W. GARY.
ROBERT B. SECOR.

REFERENCES CITED

The following references are of record in the file of this patent:

UNITED STATES PATENTS

| Number | Name | Date |
|---|---|---|
| 2,066,212 | McKellar | Dec. 29, 1936 |
| 1,800,687 | Henderson et al. | Apr. 14, 1931 |
| 1,991,819 | Nutting | Feb. 19, 1935 |
| 1,598,255 | Prutzman | Aug. 31, 1926 |
| 2,315,410 | Fitzsimons | Mar. 30, 1943 |
| 2,283,174 | Bates | May 19, 1942 |
| 2,242,553 | Thomas et al. | May 20, 1941 |
| 2,229,353 | Thomas et al. | Jan. 21, 1941 |
| 2,403,753 | Pierce et al. | July 9, 1946 |